Figure 1:
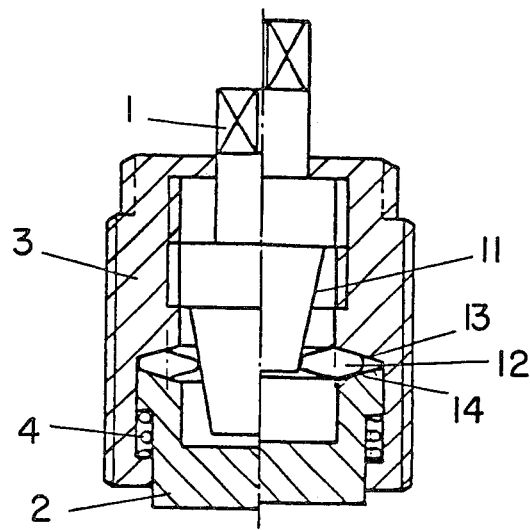

United States Patent [19]

Poot

[11] 4,384,707

[45] May 24, 1983

[54] MECHANICAL CLAMPING DEVICE

[76] Inventor: Pieter Poot, Termijen 7, Postbus 148, 1850 AC Heiloo, Netherlands

[21] Appl. No.: 127,983

[22] Filed: Mar. 4, 1980

[30] Foreign Application Priority Data

Mar. 5, 1979 [NL] Netherlands ............... 7901272

[51] Int. Cl.³ ............................................. B25B 1/06
[52] U.S. Cl. ................................ 269/217; 269/234; 269/229; 269/240; 269/32; 74/110
[58] Field of Search ............... 269/27, 32, 217, 229, 269/234, 240; 74/110

[56] References Cited

U.S. PATENT DOCUMENTS 3,941,362  3/1976  Arnold et al. ................. 269/32
4,270,398  6/1981  Arnold ........................ 269/32 X

FOREIGN PATENT DOCUMENTS 1288523  1/1969  Fed. Rep. of Germany ...... 269/217
2370554  9/1968  France ......................... 269/32

Primary Examiner—Robert C. Watson
Attorney, Agent, or Firm—Cushman, Darby & Cushman

[57] ABSTRACT

A mechanical clamping device, especially for clamping with high force of workpieces and tools, provided with clamping elements, characterized by an axial movable and helical rotatable conical wall (11,21), against which rest similar bodies of revolution (12,22), which are positioned on a changeable concentric circle of center between two converging, concentric surfaces of revolution (13,14,23,24), which are movable axially in respect of each other. Due to the extreme favorable behaviour of the rotating bodies of revolution (12,22) which displace themselves at rotation in a helical way between the surfaces of revolution (13,14,23,24), these surfaces are rolled and forced from each other. By this a favorable and equally distributed force transmission is obtained with a high degree of efficiency.

9 Claims, 7 Drawing Figures

MECHANICAL CLAMPING DEVICE

The invention relates to a mechanical clamping device, especially for clamping workpieces and tools with high force, provided with clamping elements, by which through a helical rotation of an axial movable conical wall, the here against thrusting bodies of revolution are rotated to a larger or smaller circle of centre between two converging, concentrical surfaces of revolution, through which these displace themselves axially in respect to each other.

With existing mecanical clamping devices the workpiece or tool is pre-clamped with a screw spindle and nut with a coarse pitch to enable fast axial displacement. Clamping with high clamping force is here only possible by means of big levers, by which high friction of the screw thread has to be overcome and the spindle is subjected to big torsional stresses. Existing mecanical clamping devices are therefore executed with a pre-clamping device and a device for clamping with high forces. In vices the jaws are brought against the workpiece by a screw spindle, after this, a mechanism starts working for clamping with high force. Here is made use of a set of toggle joint levers, which are driven by means of an auxilliary spindle, through which high clamping forces are created. At clamping nuts for clamping of workpieces and tools on shafts, the screw thread connection is used to clamp, while in the nuts toggle joint levers are installed, which can be turned in the so called "dead-position", by which high clamping forces are created. A disadvantage of toggle joint lever systems is, that it is impossible to obtain the desired clamping force by measuring the input force, as both forces are independent of each other. By this the danger is created that the clamping force is too big or too small, by which the workpiece deforms or loosens itself during machining. Another disadvantage of the toggle joint system is that it requires a lot of space and consequently a compact design is impossible. The number of toggle joint levers is restricted due to the available space, and therefore a big clamping force is only applied through a limited number of places and consequently unequal clamping take place.

The invention aims at the first place a compact and simple clamping device of the type as mentioned in the beginning, by which the aforementioned disadvantages are eliminated and the actual clamping force is in proportion to the input force, by which at the same time an equal transmission of forces takes place and of which the clamping elements are simple to install in all kinds of clamping devices.

For explanation of the invention and with reference to the drawing, the operation and some examples of execution will be described.

FIG. 1. Scheme of operation, with bodies of revolution outside the conical wall.

Figure 2:
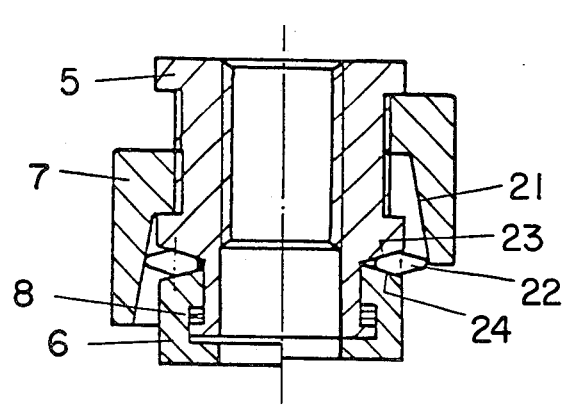

FIG. 2. Scheme of operation, with bodies of revolution inside the conical wall.

Figure 3:
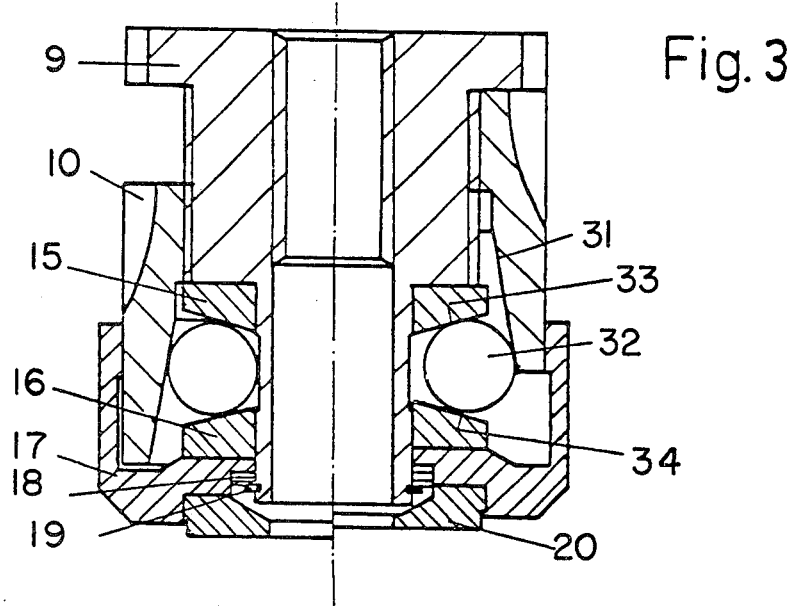

FIG. 3. Example of execution of clamping nut.

Figure 4:
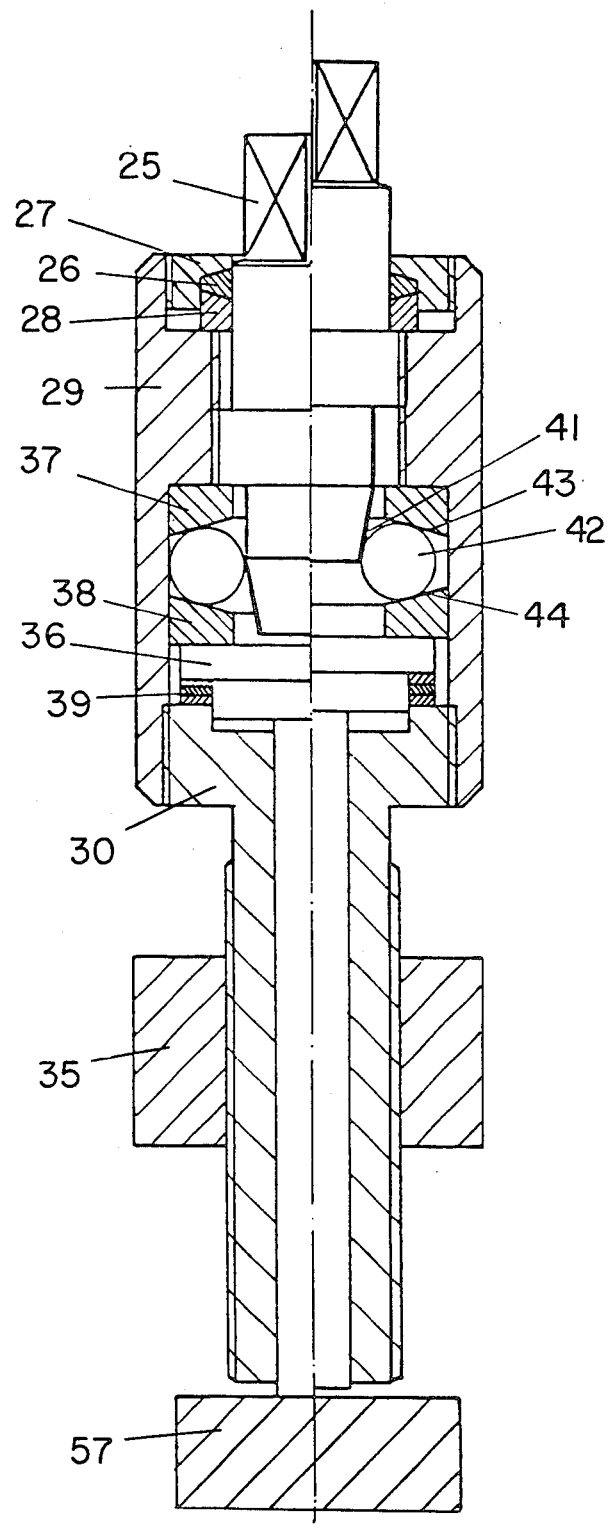

FIG. 4. Example of execution of clamping spindle.

Figure 5:
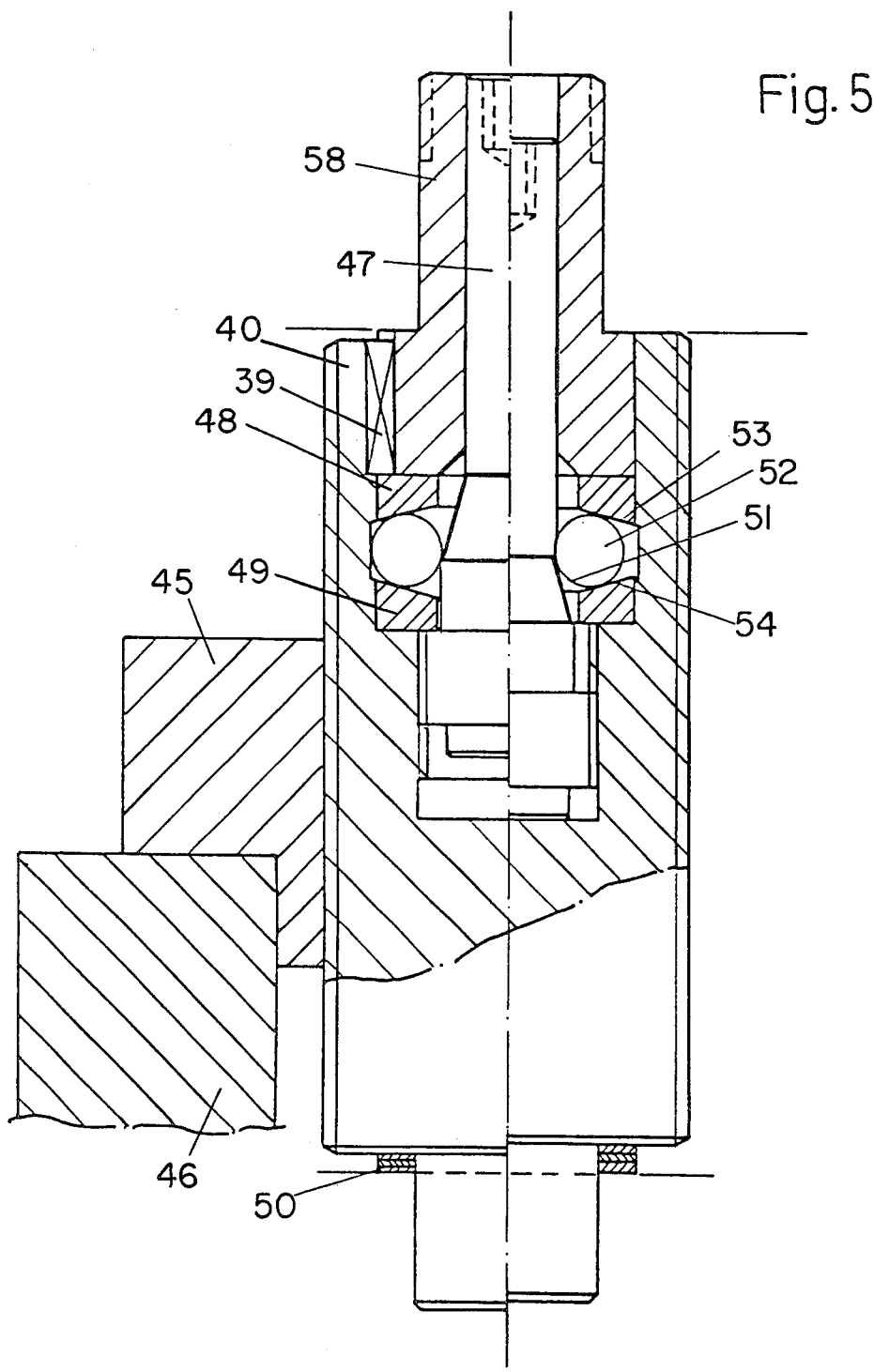

FIG. 5. Example of execution of clamping and aligning spindle for a chuck.

Figure 6:
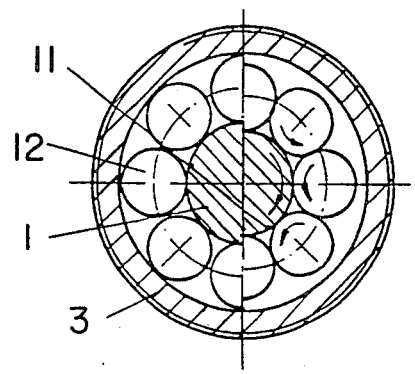

FIG. 6. Cross section over bodies of revolution 12 of FIG. 1

Figure 7:
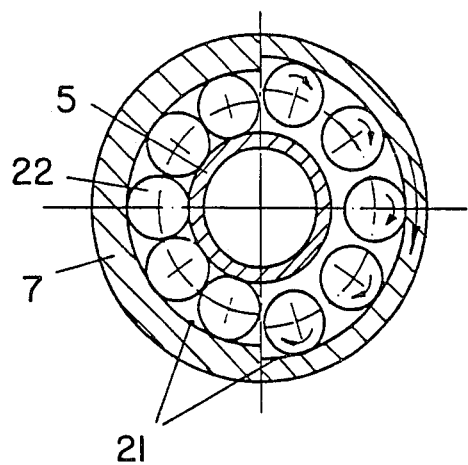

FIG. 7. Cross section over bodies of revolution 22 of FIG. 2 In all figures the section drawn at the right hand side of the centerline is the unclamped position and at the left hand side the clamped position.

In FIG. 1 and FIG. 6, conical wall 11 will make an axial and helical rotary movement by turning the screw spindle down, by which the here against thrusting bodies of revolution 12 will rotate to a larger circle of centre between the surfaces of revolution 13 and 14, by which these move away of each other and thrust piece 2 moves away in respect to spindle carrier 3. By turning upwards screw spindle 1 the bodies of revolution 12 are pressed by the present forces of clamping and/or of spring 4, via the surfaces 13 and 14 against wall 11 and rotated to a smaller circle of centre. The size of the angles between wall 11 and surfaces 13 and 14 determines the ratio of transmission to obtain high clamping forces. By the rolling movements of the bodies of revolution this clamping device has a high degree of efficiency. With a straight rotating line of wall 11 the input force is directly proportional to the clamping force while with a curved or/and broken rotating line the ratio of force transmission is not constant. The bodies of revolution 12 are positioned in such a way that they touch each other on the smallest circle of centre, by this a great number of equally distributed thrust surfaces are available for equal clamping.

In FIG. 2 and FIG. 7 the bodies of rotation 22 are positioned inside the conical wall 21. Nut 5 is turned on a shaft until the underside of thrust ring 6 presses on the piece to clamp. By turning clamping nut 7 downwards, the conical wall 21 executes a helical rotary and axial movement, by which the bodies of rotation 22 move to a smaller circle of centre between the surfaces 23 and 24, by which these move away of each other and thrust ring 6 moves away in respect to nut 5. By turning upwards of clamping nut 7 the bodies of revolution 22 are pressed against wall 21 by the present clamping forces and/or of springs 8 via surfaces 23 and 24 and moved to a larger circle of centre. For the transmission ratio and the distribution of forces the same is valid as described at FIG. 1 and FIG. 5.

FIG. 3 is an example of execution of FIG. 2, in which the bodies of revolution 32 are executed in a ball shape. Nut 9 serves for pre-clamping, while clamping nut 10, with conical wall 31, serves to turn the bodies of revolution between the surfaces 33 and 34 of the rings 15 and 16. The rings 15 and 16, balls 32, bushing 17 and spring rings 18 are fitted to nut 9 by retaining ring 19. Thrust washer 20 is pressed in bushing 17.

FIG. 4 is an example of execution of FIG. 1, in which the bodies of revolution 42, are executed in a ball shape. By turning clamping spindle 25, via clamped friction ring 26 between nut 27 and ring 28, housing 29 with locked spindle 30 will be moved downwards in nut 30, until thrust pin 36 stops against workpiece 57. By this, clamping spindle 25 slips in friction rings 26 and turns downwards by the screw thread in housing 29, by which conical wall 41 turns the bodies of revolution 42 between the surfaces 43 and 44, of rings 37 and 38, by which an axial displacement take place and ring 38, trust pin 36, against the pressure of auxilliary springs 39, presses against workpiece 57.

FIG. 5 is an example of execution of a clamping and aligning spindle for a chuck. By turning spindle 58, screw spindle 40 becomes turned via key 39, by which jaw 45 pre-clamps workpiece 46. By turning upwards clamping spindle 47, the ball shaped bodies of revolution 52 becomes rolled by the conical wall 51, between the surfaces 53 and 54 of rings 48 and 49, by which these displace themselves axially in respect to each other. Ring 49 displaces itself downwards with spindle 40 and jaw 45, against the pressure of springs 50, by which workpiece 46 becomes clamped with a high force. As with this clamping system very small axial displacements can be executed, it serves in this execution as well for accurate aligning and positioning of workpieces.

I claim:

1. In a mechanical clamping device: an actuating member having a conical wall, means mounting said actuating member for helical movement with respect to the axis of said conical wall whereby, upon such helical movement, said actuating member simultaneously rotates about said axis and moves along said axis, first and second elements each having an annular surface concentric with said axis, said surfaces facing each other and being spaced apart along said axis and being converging with respect to each other; and a plurality of bodies of revolution disposed between and in contact with said annular surfaces, said actuating member being arranged relative to said bodies of revolution such that upon helical movement of said actuating member in one direction said conical wall engages said bodies of revolution and causes them to roll on said annular surfaces thereby causing axial displacement between said first and second elements.

2. A clamping device as in claim 1 wherein said conical wall of said actuating member is disposed radially outwardly of said bodies of revolution.

3. A clamping device as in claim 1 wherein said conical wall of said actuating member is disposed radially inwardly of said bodies of revolution.

4. A clamping device as in any one of claims 1, 2 or 3 including spring means biasing said annular surfaces toward each other.

5. A clamping device as in claim 1 wherein said mounting means includes a fixed support and a threaded connection between said support and said actuating member.

6. In a clamping device: an actuating member having a conical wall; a fixed element having an annular surface concentric with said axis, said actuating member and said fixed element being connected to each other by helical threads whereby rotation of said actuating means causes said actuating means to move in an axial direction with respect to the threaded connection; a thrust element having an annular surface concentric with said axis; means mounting said thrust element for linear axial movement relative to said fixed element, said annular surfaces facing each other and being axially spaced apart and being converging with respect to each other; and a plurality of bodies of revolution disposed between and in contact with said annular surfaces, said actuating member being arranged relative to said bodies of revolution such that upon rotation and axial movement of said actuating member in one direction said conical wall engages said bodies of revolution and causes them to roll on said annular surfaces as a result of the rotation of said actuating member, to move in a radial direction and to force said thrust element in an axial direction.

7. A clamping device as in claim 6 wherein said actuating member is annular and surrounds said fixed element and said bodies of revolution whereby rotation and axial movement of said actuating member forces said bodies of revolution radially inward.

8. A clamping device as in claim 6 wherein said fixed element is annular and surrounds said actuating member whereby rotation and axial movement of said actuating member forces said bodies of revolution radially inward.

9. A clamping device as in any one of claims 6, 7 or 8 including annular spring means surrounding said thrust element and biasing said thrust element toward said fixed element.

* * * * *